United States Patent

[11] 3,619,506

[72] Inventor Camillo Bodenstein
Munich, Germany

[21] Appl. No. 754,418
[22] Filed Aug. 21, 1968
[45] Patented Nov. 9, 1971
[73] Assignee Siemens Aktiengesellschaft
Munich, Germany
[32] Priority Sept. 18, 1967
[33] Germany
[31] P 15 37 374.7

[54] SWITCHING ARRANGEMENT FOR THE AUTOMATIC DELIVERY OF TELEGRAPHIC IDENTIFICATION IMPULSE SEQUENCES
3 Claims, 2 Drawing Figs.

[52] U.S. Cl. .................... 178/81
[51] Int. Cl. .................... H04l 17/02
[50] Field of Search .................... 178/81, 79, 4.1

[56] References Cited

UNITED STATES PATENTS 3,441,671 4/1969 Hennig .................... 178/79
3,291,910 12/1966 Nicklas et al. .................... 178/79

*Primary Examiner*—Kathleen H. Claffy
*Assistant Examiner*—Thomas W. Brown
*Attorney*—Hill, Sherman, Meroni, Gross & Simpson

ABSTRACT: A switching arrangement for a teletypewriter system that allows automatic transmission of telegraphic identification impulse sequences. The invention has an electronic shift register with an electronic transmission circuit in which the individual register stages are connected in parallel to keys associated with switch means.

INVENTOR
CAMILLO BODENSTEIN

BY Hill, Sherman, Meroni, Gross & Simpson ATTORNEYS

INVENTOR
CAMILLO BODENSTEIN

BY Hill, Sherman, Meroni, Gross & Simpson
ATTORNEYS

SWITCHING ARRANGEMENT FOR THE AUTOMATIC DELIVERY OF TELEGRAPHIC IDENTIFICATION IMPULSE SEQUENCES

BACKGROUND OF THE INVENTION

1. Field of the Invention

This invention relates in general to automatic switching means and in particular to electronic teletypewriter systems that provides for automatic delivery of telegraphic identification impulse sequences.

2. Description of the Prior Art

Prior art teletypewriter transmitters have identification transmitting means, however, such systems are complex and expensive. Normally such systems require complicated encoding and decoding means in combination with punch tape or other systems which must be periodically actuated so as to transmit an identifying signal.

SUMMARY OF THE INVENTION

The present invention provides an identification transmitter in an electronic teletypewriter system which is inexpensive and which has a switching arrangement that automatically transmits telegraphic identification impulse sequences by using an electronic shift register in connection with an electronic transmission circuit. Individual register stages are connected in parallel to keys assigned to switch means so that an electronic coding and storage installation of the transmitter circuit arrangement may be used to code and store the identification impulse sequences and allows the step-by-step control of a shift register of the identification impulse transmitter.

The identification transmitter according to this invention provides that with keyboards with automatic letter-figure shift mechanisms, there need be no symbol for letter change and/or figure change to be present when changing from one symbol group to another. This releases storage in the machine for additional identification data.

Other objects, features and advantages of the present invention will be readily apparent from the following detailed description of certain preferred embodiments thereof taken in conjunction with the accompanying drawings.

DESCRIPTION OF THE PREFERRED EMBODIMENT

Figure 1:
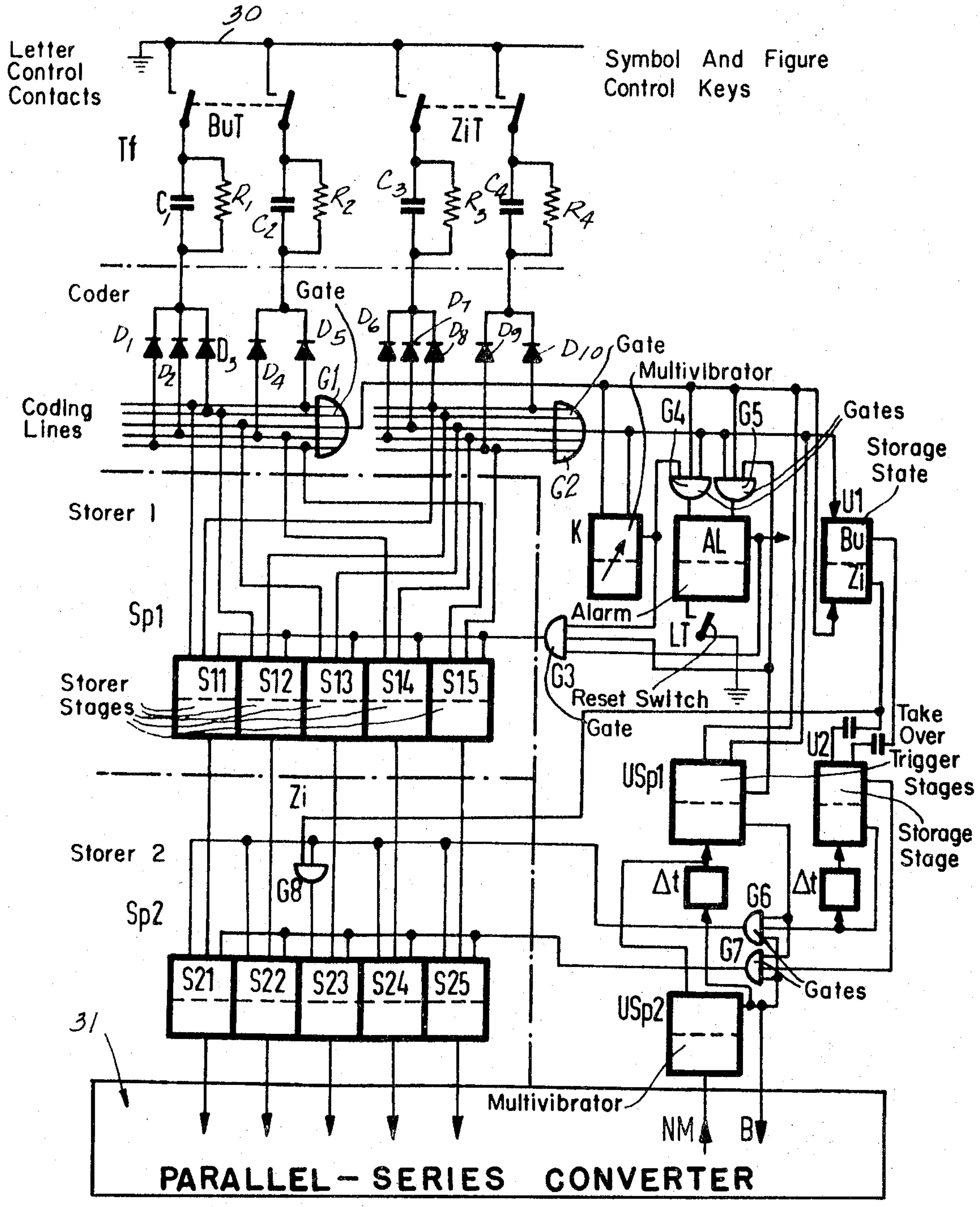
FIG. 1 is a schematic diagram for a storage transmitter with automatic letter and figure switches.
Figure 2:
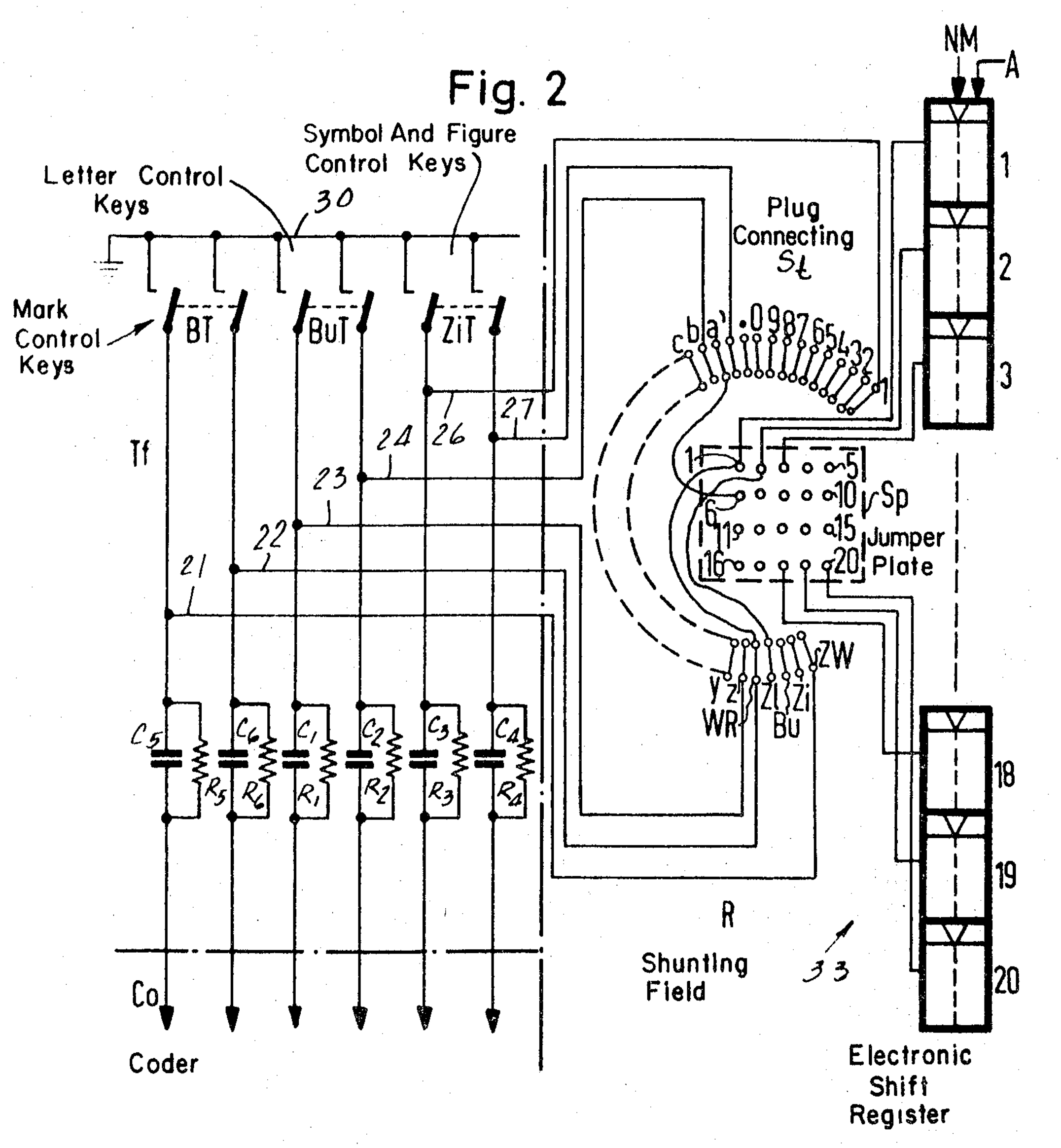
FIG. 2 illustrates the connection of the shift register of the identification transmitter to the keyboard.

FIG. 1 illustrates a ground bus 30 to which a plurality of key control contacts BuT which correspond to letter keys and a plurality of key control contacts ZiT corresponding to symbols and figures are located on a keyboard Tf. The main keys BT are not illustrated in FIG. 1, but are illustrated in FIG. 2 and are also connected to the ground bus 30. RC circuits, C1, R1, C2, R2, C3, R3, C4, R4 etc. are in series with each of the key control contacts. Diodes D1 through D10 are connected in circuit with the switch contacts BuT and ZiT as shown and are connected to gates G1 and G2, respectively.

The gate G1 receives inputs from the letter keys BuT and the gate G2 receives inputs from the symbol and figures keys ZiT. The coder CO feeds into an electronic storage Spl which has storage stages Sll through S15. A second electronic storage Sp2 receives the output of the first storer Spl and is formed with storage stages S21 through S25.

A parallel-series converter 31 is connected to the output of the storer Sp2. A monostable sweep stage or multivibrator K receives inputs from gates G1 and G2 and supplies outputs to gates G3 and G4. The output of the gate G3 is connected to the stages S11 through S15 of the storage stage Spl. Gates G4 and G5 receive inputs from gates G1 and G2 and have outputs connected to an alarm stage AL.

When a key BuT of the letter field is depressed after prior letters have been typed, an impulse is produced which shifts the storer of stages S11 to S15 through the gate G1 via the contacts BuT, the condensers C1 through C2 and the diodes D1 through D5 to the coding lines. The gate G1 turns on the takeover storer trigger stages USp1 which blocks all storage stages of the first storer, and applies a positive potential to gate G6. This turns on the register stage USp2. A message is transmitted over the conduit B which declares that the message placed in the storer Sp2 is binding. The parallel-series converter 31 receives this message and supplies an output message report via conduit NM which indicates that the takeover of the symbols stored in the second storer has occurred and prepares or switches the gate 7 to take over a symbol from storer Sp1 to storer Sp2. As a result of the takeover the sweep stage or multivibrator USp2 is reset and a new message command is issued.

If following a letter key, a figure key is depressed, the figure change symbol is first transmitted ahead of the desired figure. This is accomplished through the two storage stages U1 and U2 in the following manner. By changing from letters to figures the storer stage is shifted to figures, whereby an impulse is transmitted to the stage which stores the shift command. This stage transmits the release impulse for taking over the prewired figure impulse which is fed into the storer Sp2 as soon as it is unoccupied, at the same time blocking takeover of the actual figure symbol delivered into storer Sp1 until the figure switching has been taken over by the parallel-series converter 31.

If an error occurs, as for example, if two keys are struck simultaneously or when the speed of the machine is exceeded, the transmission of an erroneous symbol must be prevented and the typist must be informed by back pressure on the fingers that he operated.

The multivibrator K prevents two keys from being struck simultaneously and prevents the second key from being struck too closely behind the first key. It responds to each depression of a key for a certain period. During this time if a key is struck, the keyboard will be blocked electronically via the alarm sweep stage or multivibrator AL. At the same time all blocking magnets for the keys (not shown) are energized and the blocking condition will be communicated to the typist through the keys which become hard to operate. At the same time a warning light may be turned on. This also happens when the operator operates the machine at too high a speed. The blocking condition of the keyboard can be eliminated by losing the reset switch LT.

FIG. 2 illustrates the individual stages of a 20 stage electronic shift register 33. The stages 1 through 20 of the shift register 33 are in parallel with the key control contacts in the transmission circuit arrangement of the electronic teletypewriter illustrated in FIG. 1. As many as 20 of these contacts identified as BuT, ZiT and or BT can be connected in parallel through a shunting field R which has plug connections St and a jumper plate Sp. Leads connect various contacts of the jumper plate Sp to the stages 1 through 20 of the shift register 33. For the setting shown in FIG. 2 identification will be released via conduit A. The keyboard circuit is used for both coding and storage of the identification impulse sequences and for the step-by-step control of the shift register through conduit A and for the identification transmission through conduit NM of the parallel-series converter. The identification transmission through conduit NM of the parallel-series converter. The identification transmitter can be produced relatively cheaply by including it in the keyboard so that it an be formed from integrated building modules. The identification may be easily changed by hanging the jumper connections on the connection block Sp to the shift register output. This makes it unnecessary to keep an inventory of numerous parts as the jumper board Sp may be wired for each situation by unskilled workers.

The transmission of short texts with the same electronics is possible by switching the shift register outputs to a second group of plugs for example via protective gas contacts. This may be advantageous for machines which do not have punched tape scanners where brief texts are to be transmitted for answering a call (for example if the subscriber is out of town). Also for optional transmission of several different symbol sequences by the identification transmitter differently wired prongs may be alternately used. Thus it is seen that this invention relates to telegraph signal transmitting apparatus. There is provided telegraph signal transmitting apparatus including a plurality of manually operable contacts each provided with a coding arrangement connected to a first multistage storer so that operation of any one of said contacts sets the stages of said first storer in accordance with the coding arrangement of the operated contact to enter in said first storer a telegraph signal corresponding to the operated contact. A second multistage storer has individual stages which are controllable by the stages of the first storer so that the signal entered in the first storer can be transferred to the second storer and a parallel-series converter is connected to the stages of said second storer. Means for supplying a command signal to initiate transfer of the telegraph signal from the first storer to the second storer when the parallel-series converter has completed takeover of the previous signal from the second storer is provided as well as an electronic shift register having a plurality of stages connected in parallel with a predetermined plurality of said contacts. Stepping of said shift register is controlled by said command signal so that when said shift register has been put into operation, it effects the automatic serial transmission of the telegraph signals associated with the ones of said contacts connected in parallel with the stages thereof, using the coding arrangements provided for the respective contacts.

Although minor modifications might be suggested by those versed in the art, it should be understood that I wish to embody within the scope of the patent warranted hereon all such modifications as reasonably and properly come within the scope of my contribution to the art.

We claim:

1. Telegraph signal transmitting apparatus including a plurality of manually operable contacts each provided with a coding arrangement connected to a first multistage storer so that operation of any one of said contacts sets the stages of said first storer in accordance with the coding arrangement of the operated contact to enter in said first storer a telegraph signal corresponding to the operated contact, a second multistage storer the individual stages of which are controllable by the stages of the first storer so that the signal entered in the first storer can be transferred to the second storer, a parallel-series converter connected to the stages of said second storer, means for supplying a command signal to initiate transfer of the telegraph signal from the first storer to the second storer when the parallel-series converter has completed takeover of the previous signal from the second storer, and an electronic shift register having a plurality of stages connected in parallel with a predetermined plurality of said contacts and the stepping of said shift register being controlled by said command signal so that when said shift register has been put into operation it effects the automatic serial transmission of the telegraph signals associated with the ones of said contacts connected in parallel with the stages thereof, using the coding arrangements provided for the respective contacts.

2. Apparatus as claimed in claim 1 wherein said contacts are operable by means of keys.

3. Apparatus as claimed in claim 1 including a plug board by means of which said parallel connections are established.

* * * * *

UNITED STATES PATENT OFFICE
CERTIFICATE OF CORRECTION

Patent No. 3,619,506 Dated November 9, 1971

Inventor(s) CAMILLO BODENSTEIN

It is certified that error appears in the above-identified patent and that said Letters Patent are hereby corrected as shown below:

Column 2, line 6, delete "storer";

lines 62-64, delete "The... verter";

line 65, change "an" to --can--;

line 67, change "hanging" to --changing--.

Signed and sealed this 18th day of July 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334